M. G. TROXELL.
FRUIT CUTTER.
APPLICATION FILED JUNE 24, 1908.

921,917.

Patented May 18, 1909.

Witnesses
J. G. Hinkel
H. O. Reed

Inventor
Mary G. Troxell
By C. W. Clement
Attorneys

UNITED STATES PATENT OFFICE.

MARY G. TROXELL, OF SUNBURY, PENNSYLVANIA.

FRUIT-CUTTER.

No. 921,917.  Specification of Letters Patent.  Patented May 18, 1909.

Application filed June 24, 1908. Serial No. 440,171.

*To all whom it may concern:*

Be it known that I, MARY G. TROXELL, a citizen of the United States, residing at Sunbury, in the county of Northumberland and State of Pennsylvania, have invented new and useful Improvements in Fruit-Cutters, of which the following is a specification.

This invention relates to improvements in fruit cutters and especially to grape fruit cutters, adapted to prepare the fruit for the table so that it may be easily removed from the rind for eating.

Figure 1:
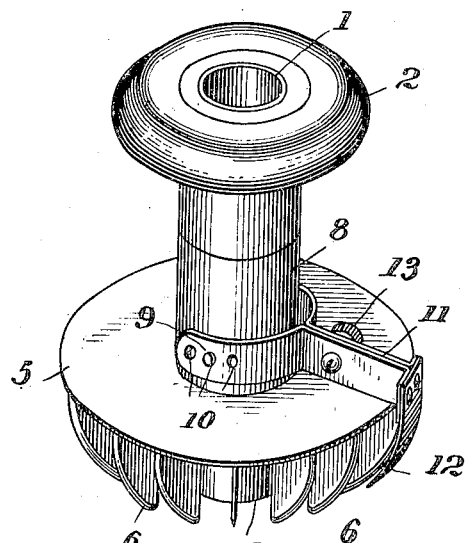
Figure 2:
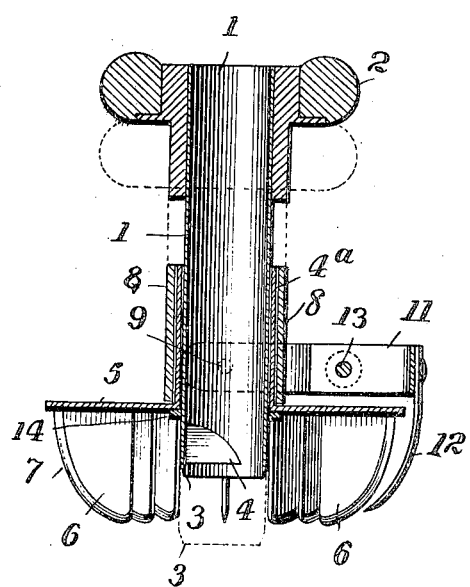
Figure 3:
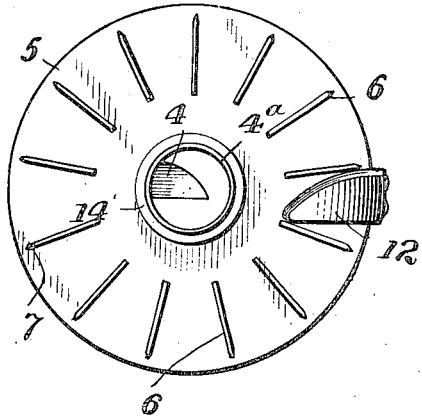

The various features of the invention will be hereinafter more fully described in connection with the accompanying drawing, in which, Figure 1 is a perspective view of the cutter constructed in accordance with this invention; Fig. 2 is a vertical sectional view showing all the parts assembled; Fig. 3 is a bottom plan view.

Referring to the drawing, 1 indicates a tubular coring knife having a suitable knob or handle 2 at one end and having its opposite end sharpened as shown at 3, for the purpose of severing the core of the fruit from the partitions between the cells. Within the tubular coring knife, near its sharpened end, is arranged a cutter 4 which is secured to the inner wall of the coring knife and projects inwardly slightly past the center of the tubular knife, this cutter being adapted to sever the core from the rind. A circular disk 5 is provided with a series of radially arranged knives 6 on its lower side the outer edges 7 of these knives being curved and sharpened as shown. This disk has a central opening surrounded by a sleeve-bearing 4ª which projects from that side of the disk which is opposite to the knives 6. Upon the sleeve-bearing 4ª is arranged a sleeve 8, which is rotatable upon said bearing. Pintles or trunnions 9 project from opposite sides of the sleeve 8, and an arm 11 has a forked end, as shown, which is provided with openings 10 adapted to engage the trunnions or pintles 9. The arm 11 projects radially from the central axis of the tubular cutter, and extends slightly beyond the edge of the disk 5, and a curved knife 12 is secured to the free end of said arm and extends downwardly and inwardly a short distance from the cutting edges of the knives 6. This arm, as shown, is made of two connected parts which may be sprung apart by loosening the set screw 13, and the radial length of the arm may be varied by inserting the pintles 9 through different openings 10 in the fork of the arm. The longitudinal movement of the coring knife with respect to the other parts of the device is limited in one direction by a collar 14 on said knife which engages the disk 5, and in the opposite direction by the sleeve of the knob 2 which, when the coring knife is pressed inward to remove the core, abuts against the sleeve bearing 4ª and the sleeve 8, as indicated in dotted lines in Fig. 2.

In operation, the device is placed upon the flat surface of the half of a grape fruit or other fruit, with the knives 6 directly over the partitions between the cells or sections of the fruit and the coring knife surrounding the core of the fruit. The knife 12 will then be next to the rind or skin. This latter knife may be adjusted radially, for large or small fruit. By forcing the coring knife downward the cells are separated from the core and this downward pressure of the coring knife also forces the knives 6 downward into the fruit to divide the latter into sections. By turning the coring knife, the cutter 4 then cuts the core loose from the rind and by then turning the arm 11, the curved knife 12 cuts the rind loose from the fruit around the sides. With these various operations performed, the cored fruit is easily removed from the rind by a spoon while eating.

What I claim is:—

1. In a fruit cutter, a disk having a series of radially arranged knives for dividing the fruit and having a central opening, and a tubular coring knife extending through said opening and rotatable therein, said tubular coring knife having an interior cutter for severing the core from the rind.

2. In a fruit cutter, a disk having a series of radially arranged knives for dividing the fruit and having a central opening, a tubular coring knife extending through said opening and rotatable therein, said tubular coring knife having an interior cutter for severing the core from the rind, an arm rotatable about the axis of the tubular cutter, and a curved knife secured to said arm and adapted to sever the fruit cells from the rind.

3. In a fruit cutter, a disk having a series of radially arranged knives for dividing the fruit and having a central opening, a tubular coring knife extending through said opening and rotatable therein, said tubular coring knife having an interior cutter for severing the core from the rind, a sleeve rotatable about the axis of the tubular cutter, an arm hinged to said sleeve and a curved knife secured to the free end of said arm and adapted to sever the fruit cells from the rind.

4. In a fruit cutter, a disk having a series of radially arranged knives for dividing the fruit and having a central opening, a tubular coring knife extending through said opening and rotatable therein, said tubular coring knife having an interior cutter for severing the core from the rind, a sleeve rotatable about the axis of the tubular cutter, an arm hinged to said sleeve, a curved knife secured to the free end of said arm and adapted to sever the fruit cells from the rind, and means for adjusting the length of said arm.

5. In a fruit cutter, a disk having a series of radially arranged knives adapted to divide the fruit, said disk having a central sleeve bearing, a tubular coring knife rotatable and longitudinally movable within said sleeve bearing a sleeve surrounding said sleeve bearing, an arm hinged to said latter sleeve, and a curved knife secured to the free end of said arm and adapted to sever the fruit cells from the rind.

In testimony whereof I affix my signature, in presence of two subscribing witnesses.

MARY G. TROXELL.

Witnesses:
JOHN WEISER BASSLER,
C. W. CLEMENT.